United States Patent
Yoo et al.

(10) Patent No.: US 9,827,994 B2
(45) Date of Patent: Nov. 28, 2017

(54) SYSTEM AND METHOD FOR WRITING OCCUPANCY GRID MAP OF SENSOR CENTERED COORDINATE SYSTEM USING LASER SCANNER

(71) Applicants: HYUNDAI MOTOR COMPANY, Seoul (KR); KIA MOTORS CORPORATION, Seoul (KR); Industry-Academic Cooperation Foundation, Yonsei University, Seoul (KR)

(72) Inventors: Minkyun Yoo, Seoul (KR); Seongkeun Park, Seoul (KR); Hoon Lee, Gunpo-si (KR); Hyungsun Jang, Anyang-si (KR); Hyunju Kim, Yongin-si (KR); Youngwon Kim, Suwon-si (KR); Euntai Kim, Seoul (KR); Beomseong Kim, Seoul (KR); Baehoon Choi, Seoul (KR); Jhonghyun An, Seoul (KR)

(73) Assignees: HYUNDAI MOTOR COMPANY, Seoul (KR); KIA MOTORS CORPORATION, Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 14/958,670

(22) Filed: Dec. 3, 2015

(65) Prior Publication Data

US 2016/0378115 A1 Dec. 29, 2016

(30) Foreign Application Priority Data

Jun. 25, 2015 (KR) ........................ 10-2015-0090720

(51) Int. Cl.
*G01C 21/00* (2006.01)
*B60W 40/105* (2012.01)
(Continued)

(52) U.S. Cl.
CPC ........... *B60W 40/105* (2013.01); *G01C 21/00* (2013.01); *G01S 17/42* (2013.01); *G01S 17/66* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 7,142,150 B2 * | 11/2006 | Thackray | G01S 7/41 342/118 |
| 7,211,980 B1 * | 5/2007 | Bruemmer | G05D 1/0246 318/567 |

(Continued)

FOREIGN PATENT DOCUMENTS

| | | | |
|---|---|---|---|
| JP | 2003-098256 A | 4/2003 | |
| JP | 2004-062380 A | 2/2004 | |

(Continued)

OTHER PUBLICATIONS

Thorsten Weiss et al., "Robust Driving Path Detection in Urban and Highway Scenarios Using a Laser Scanner and Online Occupancy Grids", Proceedings of the 2007 IEEE Intelligent Vehicles Symposium Istanbul, Turkey, Jun. 13-15, 2007.

(Continued)

*Primary Examiner* — Jonathan L Sample
(74) *Attorney, Agent, or Firm* — McDermott Will & Emery LLP (57) ABSTRACT

A system for writing an occupancy grid map of a sensor centered coordinate system using a laser scanner includes a (Continued)

data unit that includes scan data read by the laser scanner, a past measurement map, and data relating to a movement of the sensor, a mapping unit for stochastically combining a current measurement map written from the scan data with a predicted map written by using the past measurement map and the data relating to a movement of the sensor, and a static and dynamic object detection unit for determining whether an object in the occupancy grid map is a static or a dynamic object by using a mapping algorithm of the mapping unit.

6 Claims, 6 Drawing Sheets

(51) Int. Cl.
  G01S 17/42 (2006.01)
  G01S 17/66 (2006.01)
  G01S 17/89 (2006.01)
(52) U.S. Cl.
  CPC .......... *G01S 17/89* (2013.01); *B60W 2520/14* (2013.01)

(56) References Cited

U.S. PATENT DOCUMENTS

| | | | | |
|---|---|---|---|---|
| 8,386,081 | B2* | 2/2013 | Landry | G05D 1/0272 318/568.12 |
| 8,428,778 | B2* | 4/2013 | Landry | G05D 1/0272 318/568.12 |
| 8,798,840 | B2* | 8/2014 | Fong | G05D 1/0274 700/258 |
| 2004/0013295 | A1* | 1/2004 | Sabe | G06T 7/97 382/153 |
| 2005/0131581 | A1* | 6/2005 | Sabe | G06K 9/00201 700/245 |
| 2005/0182518 | A1* | 8/2005 | Karlsson | G05D 1/0246 700/253 |
| 2005/0234679 | A1* | 10/2005 | Karlsson | G05D 1/0272 702/181 |
| 2008/0009970 | A1* | 1/2008 | Bruemmer | G05D 1/0088 700/245 |
| 2008/0027591 | A1* | 1/2008 | Lenser | G05D 1/0274 701/2 |
| 2008/0046125 | A1* | 2/2008 | Myeong | G05D 1/0219 700/253 |
| 2009/0234499 | A1* | 9/2009 | Nielsen | B25J 9/161 700/250 |
| 2010/0121488 | A1 | 5/2010 | Lee et al. | |
| 2010/0277309 | A1* | 11/2010 | Anderson | A61B 5/1113 340/539.13 |
| 2011/0047338 | A1* | 2/2011 | Stahlin | G01C 21/28 711/154 |
| 2011/0054689 | A1* | 3/2011 | Nielsen | G05D 1/0088 700/258 |
| 2011/0082585 | A1* | 4/2011 | Sofman | G05D 1/0274 700/259 |
| 2012/0053755 | A1* | 3/2012 | Takagi | B60W 40/04 701/1 |
| 2012/0239191 | A1* | 9/2012 | Versteeg | G06N 3/004 700/246 |
| 2014/0122409 | A1* | 5/2014 | Na | G06N 99/005 706/52 |
| 2014/0129027 | A1* | 5/2014 | Schnittman | G05D 1/0219 700/253 |
| 2014/0379256 | A1* | 12/2014 | Stipes | G01C 21/165 701/501 |
| 2016/0378111 | A1* | 12/2016 | Lenser | G05D 1/0274 701/2 |

FOREIGN PATENT DOCUMENTS

| | | |
|---|---|---|
| JP | 2012-123471 A | 6/2012 |
| KR | 10-2009-0010367 A | 1/2009 |
| KR | 10-2009-0078208 A | 7/2009 |
| KR | 10-2012-0091937 A | 8/2012 |
| KR | 10-2013-0102873 A | 9/2013 |
| KR | 10-2014-0054763 A | 5/2014 |
| KR | 10-1409323 B1 | 7/2014 |

OTHER PUBLICATIONS

Korean Notice of Allowance dated Mar. 22, 2017, issued in Korean Application No. 10-2015-0090720.

* cited by examiner

SYSTEM AND METHOD FOR WRITING OCCUPANCY GRID MAP OF SENSOR CENTERED COORDINATE SYSTEM USING LASER SCANNER

CROSS-REFERENCE TO RELATED APPLICATION

This application claims the benefit of priority to Korean Patent Application No. 10-2015-0090720, filed on Jun. 25, 2015 with the Korean Intellectual Property Office, the disclosure of which is incorporated herein in its entirety by reference.

TECHNICAL FIELD

The present disclosure relates to a system and a method for writing an occupancy grid map of a sensor centered coordinate system using a laser scanner, and more particularly, to a technology for generating an occupancy grid map which is written in a sensor centered coordinate system using a laser scanner.

BACKGROUND

Laser technology is used for various purposes such as medical treatments, machining, precision measurement, industrial control, imaging, lighting, and the arts.

In particular, since a ray of a laser is focused, the laser may illuminate only a specific target, and it is possible to calculate the distance to the target by measuring the arrival time of a reflected wave reflected from the target, and three dimension image information including distance information may be obtained.

In order to obtain a three-dimensional image using the laser, the distance information for each pixel should be calculated by discharging a laser pulse for each pixel while performing a two-dimensional scanning of the X-axis and the Y-axis in the direction to be observed, and measuring the reception time of the reflected wave.

Thus, a laser scanner has two key functions including a function of scanning by a two-dimensional mechanical method in the X-axis and the Y-axis and a function of measuring a distance using a reflected wave.

SUMMARY OF THE DISCLOSURE

The present disclosure has been made in view of the above problems, and provides a technology for generating an occupancy grid map around a sensor written in a sensor centered coordinate system using a single laser scanner, and provides a system and a method for writing an occupancy grid map of a sensor centered coordinate system using a laser scanner to compensate a loss of displacement which occurs when the occupancy grid map moves and determine whether an object detected by the occupancy grid map is a static object or a dynamic object.

In accordance with an aspect of the present disclosure, a system for writing an occupancy grid map of a sensor centered coordinate system using a laser scanner includes: a data unit configured to include a scan data read by the laser scanner, a past measurement map, and a data relating to a movement of sensor; a mapping unit configured to stochastically combine a current measurement map written from the scan data with a predicted map written by using the past measurement map and the data relating to a movement of sensor; and a static and dynamic object detection unit configured to determine whether an object in the occupancy grid map is a static or dynamic object by using a mapping algorithm of the mapping unit. The data relating to a movement of sensor includes speed or yaw information received from a user vehicle. The occupancy grid map is recursively updated by using the scan data which is measured every hour.

In accordance with another aspect of the present disclosure, a method for writing an occupancy grid map of a sensor centered coordinate system using a laser scanner includes: measuring a scan data by using the laser scanner provided to a user vehicle; writing a predicted map which is predicted as a sensor centered coordinate system by using a past measurement map and a data relating to a movement of sensor; writing a current measurement map by using the measured scan data; and writing the occupancy grid map of a sensor centered coordinate system by stochastically combining the written current measurement map with the written predicted map.

Writing a predicted map includes: calculating a displacement of the user vehicle by using the data relating to a movement of sensor; and calculating a significant displacement by adding the displacement of the user vehicle to a past surplus displacement, and calculating a current surplus displacement. The data relating to a movement of sensor includes speed or yaw information received from the user vehicle. After writing the occupancy grid map of a sensor centered coordinate system, the method further includes determining whether an object in the occupancy grid map is a static or dynamic object. The occupancy grid map is recursively updated by using the scan data which is measured every hour.

The present technology is a technology for generating an occupancy grid map around a sensor written in a sensor centered coordinate system using a single laser scanner.

In addition, the present technology compensates a loss of displacement which occurs when the occupancy grid map moves, thereby reducing a discretization error, and solving the inconsistency of a map.

In addition, it is possible to determine a static object or a dynamic object by using an occupancy grid map written in a sensor centered coordinate system.

BRIEF DESCRIPTION OF THE DRAWINGS

The objects, features and advantages of the present disclosure will be more apparent from the following detailed description in conjunction with the accompanying drawings, in which.

DETAILED DESCRIPTION

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Figure 1:
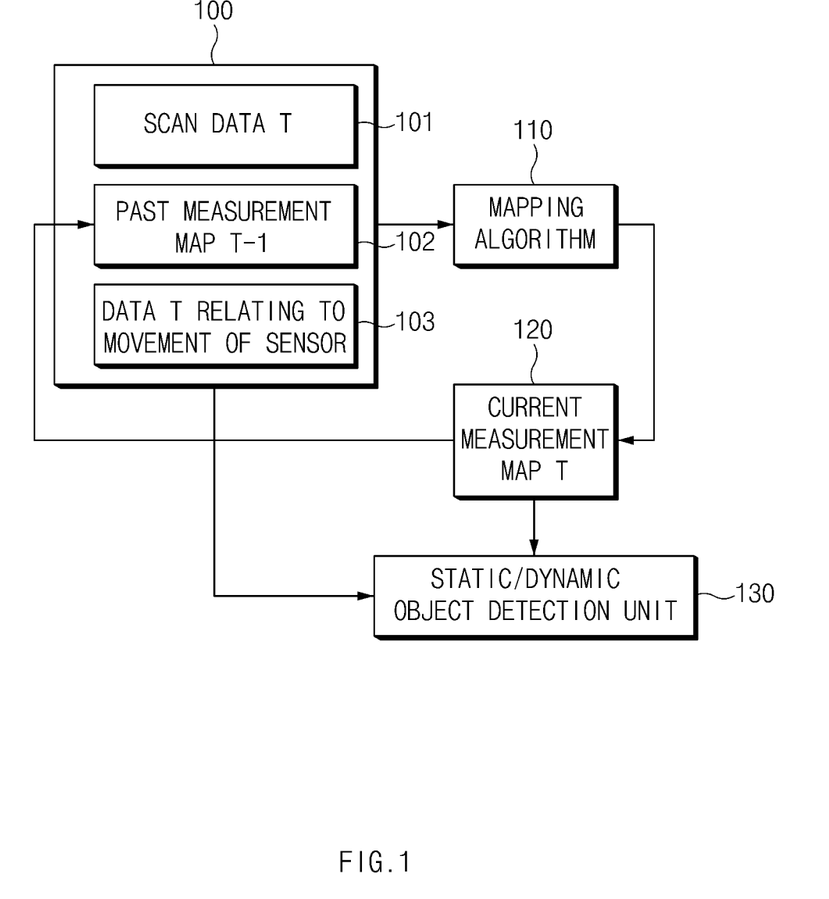
FIG. 1 is a diagram illustrating a configuration of a system for writing an occupancy grid map of a sensor centered coordinate system using a laser scanner according to an embodiment of the present disclosure.

FIG. 1 is a diagram illustrating a configuration of a system for writing an occupancy grid map of a sensor centered coordinate system using a laser scanner according to an embodiment of the present disclosure.

Referring to FIG. 1, the system for writing an occupancy grid map of a sensor centered coordinate system using a laser scanner may include a first data unit 100 including a scan data 101, a past measurement map 102, data 103 relating to a movement of sensor, a mapping unit or a mapping algorithm 110, a second data unit including a current measurement map 120, and a static/dynamic object detection unit 130.

First, the scan data 101 may be data read by the laser scanner.

Next, the past measurement map 102 may mean map information, which was measured in the past, that can be expressed in a coordinate system that has a sensor which is always set as an origin.

The data 103 relating to the sensor movement may be information including a motion data of the sensor.

Here, the occupancy grid map of a sensor centered coordinate system using a laser scanner may be written by using the scan data 101, the past measurement map 102, the data 103 relating to a movement of sensor, and the current measurement map 120. Here, the current measurement map 120 may mean map information, which is currently measured, that can be expressed in a coordinate system that has a sensor which is always set as an origin.

The occupancy grid map may be recursively updated to the latest information by using scan data which is measured every hour.

In detail, the scan data, the past measurement map, and the data relating to a movement of a sensor may be mapped by a mapping algorithm, and the mapped information may be compared with the current measurement map to write the occupancy grid map. The system that writes the occupancy grid map of a sensor centered coordinate system determines whether the object in the occupancy grid map is a static object or a dynamic object.

Figure 2:
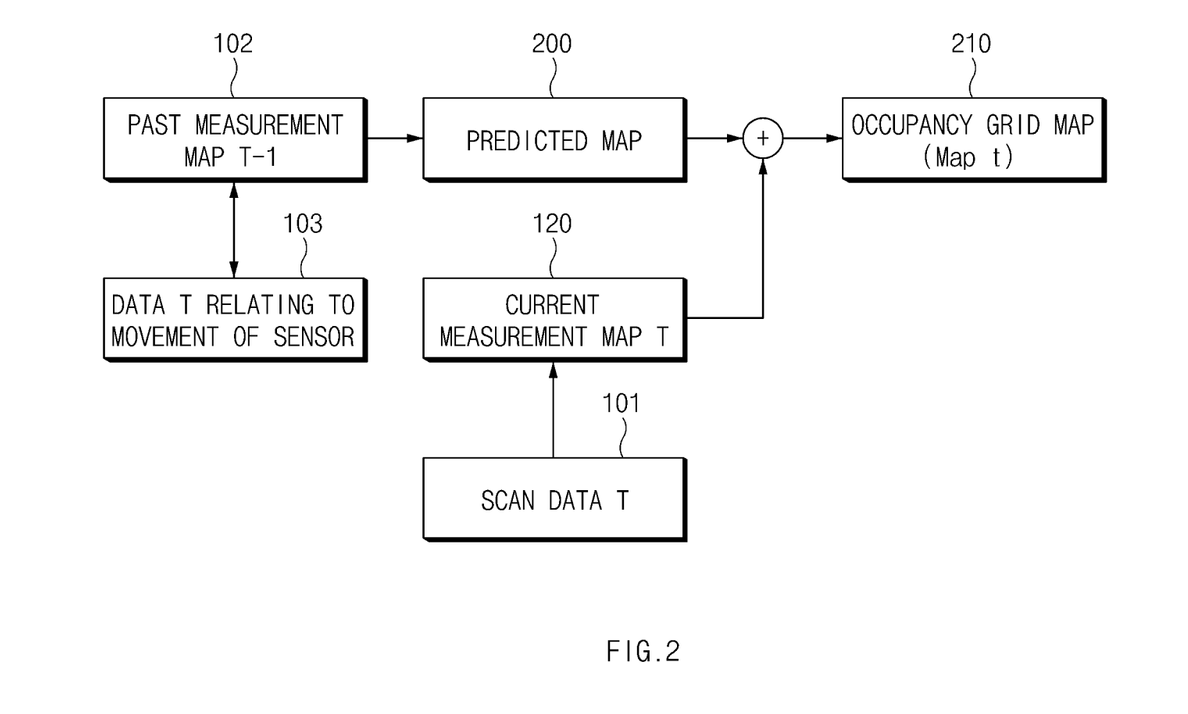
FIG. 2 is a diagram illustrating an algorithm for writing an occupancy grid map of a sensor centered coordinate system using a laser scanner according to an embodiment of the present disclosure.

FIG. 2 is a diagram illustrating an algorithm for writing an occupancy grid map of a sensor centered coordinate system using a laser scanner according to an embodiment of the present disclosure.

Referring to FIG. 2, the algorithm for writing an occupancy grid map of a sensor centered coordinate system using a laser scanner may write a predicted map 200 which is predicted as a current sensor centered coordinate system by using the past measurement map 102 and the data 103 relating to a movement of sensor, and may write the current measurement map 120 by using a new scan data that may be measured every hour.

The predicted map 200 may be stochastically combined with the current measurement map 120 to write an occupancy grid map (Map t) 210 of a sensor centered coordinate system at the current time.

Here, in the process of writing an occupancy grid map 210 by stochastically combining the predicted map 200 with the current measurement map 120, the occupancy probability of i-th grid $m_{t,i}$ on a current occupancy grid map $m_t$ in a sensor centered coordinate system at a time (t) may be expressed as shown in Equation 1. Here, $u_{1:t}$ represents movement information of the sensor from time 1 to time t, $z_{1:t}$ represents map measurement information from time 1 to time t.

$$p(m_{t,i}|z_{1:t}, u_{1:t}) \quad \text{[Equation 1]}$$

In addition, in the process of writing an occupancy grid map 210 by stochastically combining the predicted map 200 with the current measurement map 120, the occupancy probability of i-th grid $m_{t,i}$ on a changed predicted map $m_t$ in a sensor centered coordinate system from a time (t−1) to a time (t) may be expressed as shown in Equation 2.

$$p(\overline{m}_{t,i}|z_{1:t-1}, u_{1:t}) \quad \text{[Equation 2]}$$

In addition, the occupancy probability of a current occupancy grid map in a sensor centered coordinate system at a time (t) may be expressed as shown in Equation 3, and may be updated.

$$\begin{aligned}l_{t,i} &= \log\frac{p(m_{t,i}|z_{1:t}, u_{1:t})}{p(\neg m_{t,i}|z_{1:t}, u_{1:t})} \quad \text{[Equation 3]}\\ &= (1-k)\log\frac{p(\overline{m}_{t,i}|z_{1:t-1}, u_{1:t})}{p(\neg \overline{m}_{t,i}|z_{1:t-1}, u_{1:t})} + \\ &\quad \log\frac{p(m_{t,i}|z_t)}{p(\neg m_{t,i}|z_t)} - \log\frac{p(m_{t,i})}{p(\neg m_{t,i})}\end{aligned}$$

Here, k is a parameter representing uncertainty caused by the movement of the sensor centered coordinate system. Further, k is set close to 1 as the uncertainty is increased, and k is set close to 0 as the uncertainty is decreased. In addition, $\neg m_{t,i}$ represents the i-th grid which is not occupied on the occupancy grid map $m_t$.

The coordinate system of the predicted map $m_t$ at time (t) in the occupancy grid map of a sensor centered coordinate system moves as much as the displacement of the sensor in the coordinate system of the predicted map $m_{t-1}$ at time (t−1). The i-th grid $\overline{m}_{t,i}$ of the predicted map has information obtained by moving the information on i'-th grid of the predicted map at time (t−1), and is useful to recognize environment information in a highly dynamic environment by using k according to the movement of the sensor centered coordinate system.

Figure 3:
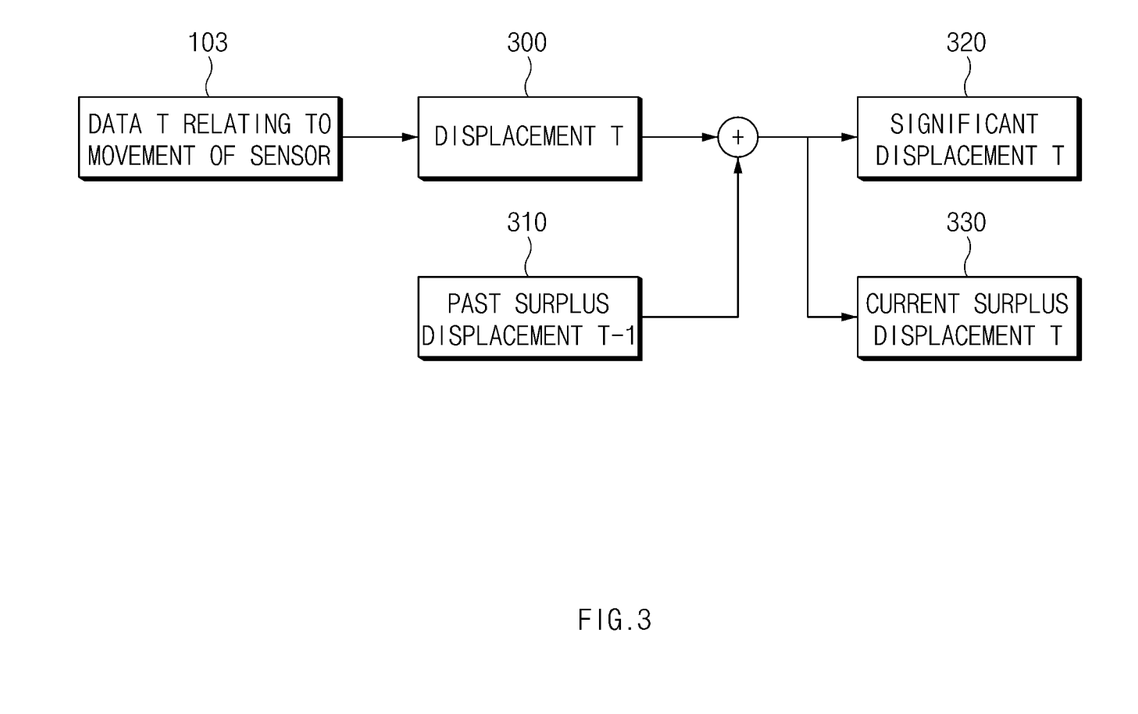
FIG. 3 is a diagram illustrating a method of writing a predicted map in an algorithm for writing an occupancy grid map of a sensor centered coordinate system using a laser scanner.

FIG. 3 is a diagram illustrating a method of writing a predicted map and an algorithm for writing an occupancy grid map of a sensor centered coordinate system using a laser scanner.

Referring to FIG. 3, in the method of writing a predicted map, the displacement in the process of converting a map coordinate system at current time (t) to a sensor centered coordinate system may be calculated.

A displacement t 300 of a user vehicle may be calculated by using motion information t 103 including speed or yaw information received from the user vehicle, and a past surplus displacement t−1 310 may be added to be separated into a significant displacement t 320 and a current surplus displacement t 330. Here, the significant displacement 320 may indicate the size of the grid on the coordinate system of the map or the sensor centered coordinate system as a unit.

For example, if the probability of the grid on the map exceeds 0.5, it is determined that the point in which data is generated from the sensor is occupied based on the probability of the grid on the map, and if the vehicle is moved 1.3 in the size of the grid on the map, the significant displacement 320 may be represented as 1, and the current surplus displacement 330 may be represented as 0.3. When the vehicle moves to the next grid from the grid on the map, an algorithm in which the current surplus displacement 330 0.3 becomes the past surplus displacement 310 0.3 to be applied to an operation is performed.

In FIG. 3, since it is possible to indicate the map based on the sensor, the map moves according to the movement of the sensor. A displacement sufficient to exceed at least one grid is required in order to move the information or the data of the grid to other grid. If the displacement is not sufficient to exceed one grid, the movement of the grid is not represented, and the displacement of the sensor is lost.

This significant displacement and the surplus displacement may be calculated as shown in Equation 4.

[Equation 4]

$$\Delta x_{t,surplus} = \begin{cases} \mod(\Delta x_{t-1,surplus} + \Delta x_t - \text{grid size}/2, \text{grid size}) - \\ \text{grid size}/2 & (1) \\ \Delta x_{t-1,surplus} + \Delta x_t & (2) \\ \mod(\Delta x_{t-1,surplus} + \Delta x_t + \text{grid size}/2, \text{grid size}) + \\ \text{grid size}/2 & (3) \end{cases}$$

$$\Delta x_{t,significant} = \Delta x_{t-1,surplus} + x_t - \Delta x_{t,surplus} \quad (4)$$

Here, $\Delta x_t$ denotes a displacement, $\Delta x_{t, surplus}$ denotes a surplus displacement, $\Delta x_{t, significant}$ denotes a significant displacement, mod denotes remaining functions, and grid size denotes a grid structure.

Equation 1 can be calculated under the condition of $\Delta x_{t-1,surplus} + \Delta x_t <$ grid size/2, Equation 2 can be calculated under the condition of $\Delta x_{t-1,surplus} + \Delta x_t <$ grid size/2 and, $\Delta x_{t-1,surplus} + \Delta x_t <$ −grid size/2 and Equation 3 can be calculated under the condition of $\Delta x_{t-1,surplus} + \Delta x_t <$ −grid size/2.

In addition, the method of recognizing a static or dynamic object using a laser scanner can measure the degree of occupation when the position of scan data is occupied on the current measurement map, and also on the past measurement map. For example, the staticity, or a measure of how static an object is, of the static object may be calculated as shown in Equation 5.

[Equation 5]

$$S(X) = \sum_{i=1}^{|x|} |(Occ(x_i, Map_t) \cap Occ(f^{-1}(x_i, u), Map_{t-1}))| / \sum_{i=1}^{|x|} |(Occ(x_i, Map_t))|$$

Figure 4:
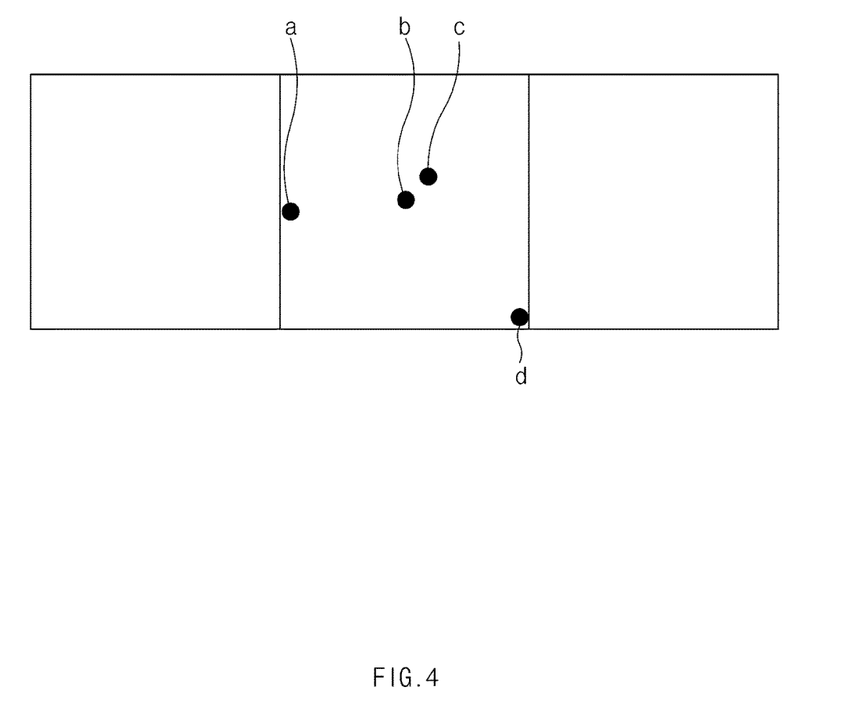
FIG. 4 is a diagram illustrating an occupancy grid map of a sensor centered coordinate system using a laser scanner according to an embodiment of the present disclosure.

FIG. 4 is a diagram illustrating an occupancy grid map of a sensor centered coordinate system using a laser scanner according to an embodiment of the present disclosure.

Referring to FIG. 4, since the grid on the occupancy grid map is represented by a discrete space and not by a continuous space, the point in which data is generated from the sensor on the grid may be represented by the same point (a, b, c, d) within the same grid.

Figure 5:
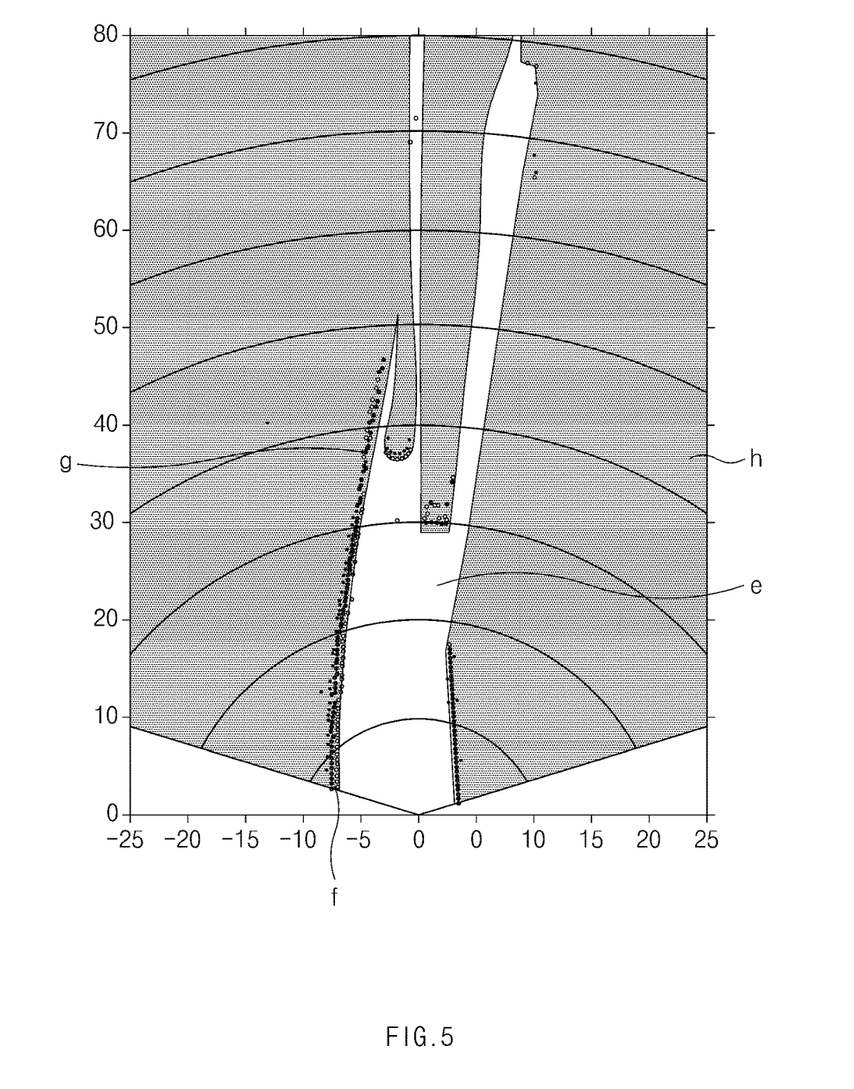
FIG. 5 and FIG. 6 are diagrams including an occupancy grid map of a sensor centered coordinate system using a laser scanner according to an embodiment of the present disclosure and a view in which a static object or a dynamic object are recognized from among surrounding objects in the occupancy grid map.
Figure 6:
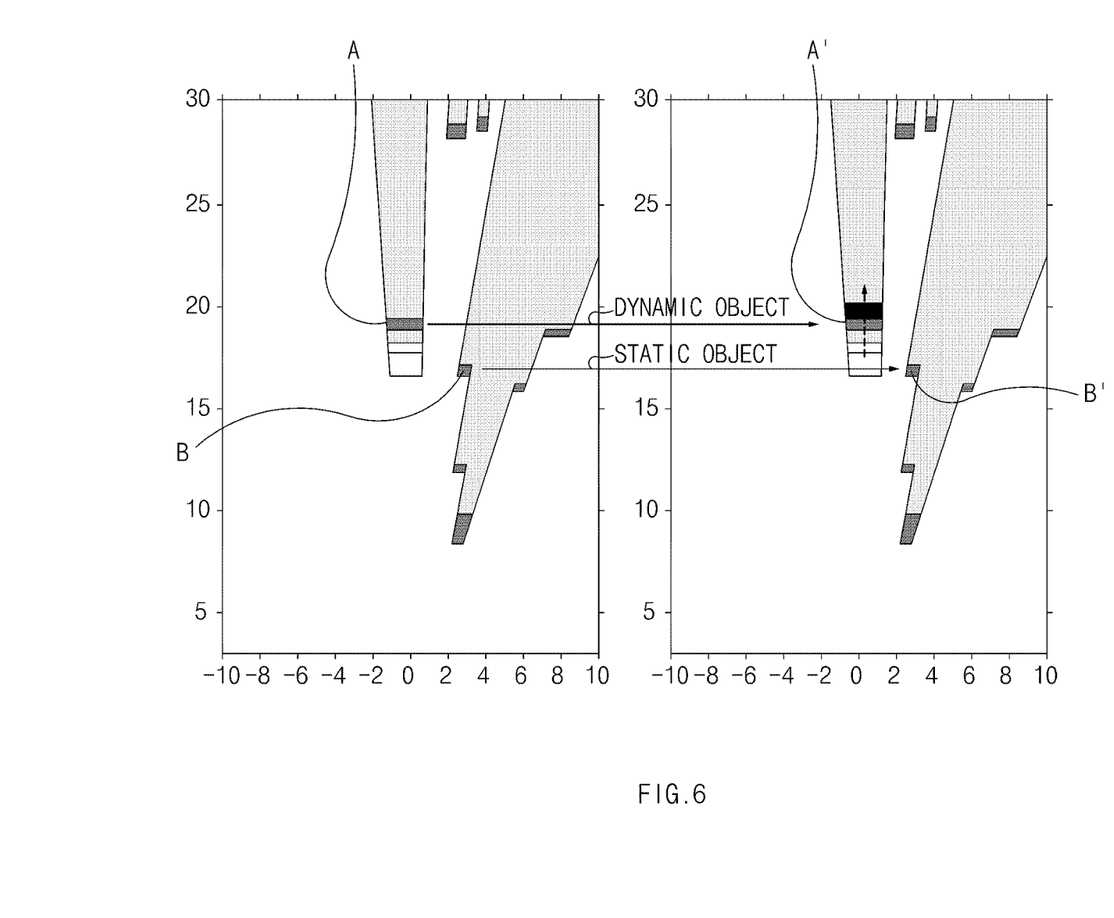

FIG. 5 and FIG. 6 are diagrams including an occupancy grid map of a sensor centered coordinate system using a laser scanner according to an embodiment of the present disclosure and a view in which a static object or a dynamic object are recognized from among surrounding objects in the occupancy grid map.

Referring to FIG. 5 and FIG. 6, in the occupancy grid map of a sensor centered coordinate system using a laser scanner, the occupied state is written in the map.

Here, the occupancy grid map represents an area e in which an object or an obstacle does not exist, a data f that the laser scanner continuously senses, an area g in which the object or the obstacle exists, and an area h in which is impossible to determine whether the object or the obstacle exist.

In addition, the dynamic object in the occupancy grid map is represented as A and A', and the static object is represented as B and B'.

As described above, the present technology is a technology for generating an occupancy grid map around a sensor written in a sensor centered coordinate system using a single laser scanner.

In addition, the present technology compensates for a loss of displacement which occurs when the occupancy grid map moves, thereby reducing a discretization error, and solving an inconsistency of a map.

Although exemplary embodiments of the present disclosure have been described in detail hereinabove, it should be clearly understood that many variations and modifications of the basic inventive concepts herein taught which may appear to those skilled in the present art will still fall within the spirit and scope of the present disclosure, as defined in the appended claims.

What is claimed is:

1. A system for writing an occupancy grid map of a sensor centered coordinate system using a laser scanner, the system comprising:
   a data unit that includes scan data read by the laser scanner, a past measurement map, and data relating to a movement of the sensor;
   a mapping unit for stochastically combining a current measurement map written from the scan data with a predicted map written by using the past measurement map and the data relating to a movement of the sensor; and
   a static and dynamic object detection unit for determining whether an object in the occupancy grid map is a static or a dynamic object by using a mapping algorithm of the mapping unit,
   wherein the occupancy grid map is recursively updated by using the scan data which is measured every hour.

2. The system of claim 1, wherein the data relating to a movement of the sensor includes information selected from the group consisting of speed and yaw information received from a user vehicle.

3. A method for writing an occupancy grid map of a sensor centered coordinate system using a laser scanner, the method comprising:
   measuring a scan data by using the laser scanner provided to a user vehicle;
   writing a predicted map which is predicted as a sensor centered coordinate system by using a past measurement map and data relating to a movement of the sensor;

writing a current measurement map by using the measured scan data; and writing the occupancy grid map of a sensor centered coordinate system by stochastically combining the written current measurement map with the written predicted map, wherein the occupancy grid map is recursively updated by using the scan data which is measured every hour.

4. The method of claim 3, wherein the step of writing a predicted map comprises:

calculating a displacement of the user vehicle by using the data relating to a movement of the sensor; and calculating a significant displacement by adding the displacement of the user vehicle to a past surplus displacement, and calculating a current surplus displacement.

5. The method of claim 3, wherein the data relating to a movement of the sensor comprises information selected from the group consisting of speed and yaw information received from the user vehicle.

6. The method of claim 3, wherein after the step of writing the occupancy grid map of a sensor centered coordinate system, further comprising determining whether an object in the occupancy grid map is a static or a dynamic object.

* * * * *